United States Patent
Frevel et al.

[15] 3,660,023
[45] May 2, 1972

[54] PROCESS FOR RECOVERING CARBON DIOXIDE FROM STACK GAS

[72] Inventors: Ludo K. Frevel, Midland; Leonard J. Kressley, Saginaw, both of Mich.

[73] Assignee: The Dow Chemical Company, Midland, Mich.

[22] Filed: Feb. 2, 1970

[21] Appl. No.: 8,036

[52] U.S. Cl. .................................. 23/150, 23/25, 23/63, 23/64
[51] Int. Cl. .................................. C01b 31/20, B01d 53/34
[58] Field of Search .................. 23/2, 2.1, 4, 150, 63, 64

[56] References Cited

UNITED STATES PATENTS

| | | | |
|---|---|---|---|
| 1,831,731 | 11/1931 | Al .................................. | 23/25 |
| 3,511,595 | 5/1970 | Fuchs .................................. | 23/4 |
| 1,583,661 | 5/1926 | Cocksedge .................................. | 23/64 |
| 1,583,662 | 5/1926 | Sundstrom et al. .................................. | 23/64 |

*Primary Examiner*—Earl C. Thomas
*Attorney*—Griswold & Burdick, Jerome L. Jeffers and William R. Norris

[57] ABSTRACT

Disclosed is a process for recovering pure $CO_2$ from stack gases produced by the combustion of carbonaceous material. The process involves contacting the stack gas with porous sodium carbonate having a high surface area, i.e., greater than 0.3 m²/gm. at a temperature of from about 40° to 75° C. Interaction between moist $CO_2$ and sodium carbonate forms $3NaHCO_3 \cdot Na_2CO_3$ which upon heating to a temperature of from 150° to 250° C. decomposes into $CO_2$, $H_2O$ and $Na_2CO_3$. The liberated $CO_2$ is readily recovered and the regenerated $Na_2CO_3$ can be used to recover additional $CO_2$ thus permitting a cyclic process.

8 Claims, No Drawings

PROCESS FOR RECOVERING CARBON DIOXIDE FROM STACK GAS

BACKGROUND OF THE INVENTION

Stack gases resulting from the combustion of carbonaceous materials such as coke, coal, oil and natural gas serve as a major source of carbon dioxide. Normally, these fuels are burned in a manner which produces a gas containing 16 to 18 percent carbon dioxide. Other gases such as oxygen, nitrogen, nitric oxide, carbon monoxide and sulfur dioxide are normally present in significant amounts in stack gas. The $CO_2$ contained in the stack gas is a useful by-product and its recovery is desirable.

One method of separating $CO_2$ from such a gas mixture is to scrub the gas by passing it countercurrent to an aqueous solution of sodium carbonate. The process results in the formation of a sodium bicarbonate solution from which $CO_2$ is recovered upon heating. In this method, $SO_2$ and other acid gases which react with the sodium carbonate solution are normally removed before the scrubbing operating.

There are several advantages to be realized by the use of solid sodium carbonate for the recovery of $CO_2$. For example, the solid system can be employed in an ordinary packed column without the necessity of scrubbing apparatus. Additionally, the heat transfer problems involved in regenerating $CO_2$ from a solid system are less than in a liquid system. However, the use of solid sodium carbonate granules has not been found to be an efficient method of recovering $CO_2$ from stack gas because only small amounts of $CO_2$ are absorbed on the surface of the granules.

It would be desirable, and it is a principal object of the present invention to provide an efficient process for the recovery of $CO_2$ from stack gas which employs solid sodium carbonate as the reactive agent.

A further object is to provide such a process which provides for the recovery of $CO_2$ in economical amounts.

An additional object is to provide such a process in which the sodium carbonate can be regenerated after reaction with the $CO_2$ so as to be useful in a cyclic system.

SUMMARY OF THE INVENTION

The invention is a process for recovering $CO_2$ from the gases produced by the combustion of carbonaceous materials. The process involves contacting the stack gas with porous sodium carbonate having a BET surface area of greater than 0.3 $m^2$/gm. at a temperature of from about 40° to 75° C. The interaction between moist $CO_2$ and carbonate results in the formation of $3NaHCO_3 \cdot Na_2CO_3$ which upon heating to a temperature of from about 150° to 250° C. dissociates the bicarbonate into $CO_2$, $H_2O$ and $Na_2CO_3$. The liberated $CO_2$ is then recovered by conventional means.

DETAILED DESCRIPTION OF THE INVENTION

Sodium carbonate forms having the surface area necessary for use in the process can be prepared by grinding solid carbonate into small particles which are then compacted.

In a preferred embodiment, the porous sodium carbonate is prepared by the thermal decomposition of porous sodium bicarbonate having a BET surface area of greater than 0.3 $m^2$/gm. The bicarbonate granules preferably have BET surface areas of from 0.5 to 2.0 $m^2$/gm. to provide carbonate having similar surface areas. Carbonate granules having BET surface areas of 0.5 to 2.0 $m^2$/gm. are preferred for use in the process. Suitable porous sodium bicarbonate may be prepared by reacting ammonium bicarbonate with a soluble sodium salt in aqueous solution wherein the concentration of sodium ion is from 5 to 7 grams ions per liter in the presence of carbon dioxide in sufficient quantity to create a partial pressure of from 15 to 40 psig while vigorously agitating the solution to form fine crystals of sodium bicarbonate. The fine crystals are separated from the reaction liquor, compacted and dried at a temperature of from 30° to 40° C. This process, which is more fully described in a copending application for a Process for the Preparation of Porous Sodium Bicarbonate executed by Ludo K. Frevel and Leonard J. Kressley at Midland, Michigan on Nov. 24, 1969 and filed in the United States Patent Office on Nov. 26, 1969 as application Ser. No. 880,424, produces hard porous sodium bicarbonate granules having a BET surface area of greater than 0.3 $m^2$/gm. The thermal decomposition of these sodium bicarbonate granules provides sodium carbonate granules suitable for use in the present process. The sodium bicarbonate is normally heated to a temperature of from 150° to 180° C. in order to decompose it into sodium carbonate.

The stack gas can be contacted with the sodium carbonate in a variety of ways. Conveniently, the gas is allowed to pass upwardly through a column packed with the sodium carbonate granules or with a mixture of sodium carbonate and some inert porous material. Since stack gas normally contains acid gases such as $SO_2$ and $NO_2$, the recovery of purified $CO_2$ is facilitated by removing these gases before contacting the stack gas with the sodium carbonate. Additionally, the reaction of the acid gases with the carbonate is irreversible so their removal is necessary for the operation of a cyclic process. The acid gases can be removed from the stack gas by a number of methods. One such method is to pass the gas through a bed of the porous sodium bicarbonate described above. After removal of the acid gases, the remaining stack gas consists essentially of $N_2$, $CO_2$, $O_2$ and small amounts of NO. Stack gas will also contain from about 3 to 25 volume percent water vapor when maintained at a temperature above its dew point. The presence of water vapor in the stack gas is necessary to provide water for the overall reaction:

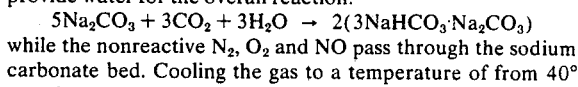

while the nonreactive $N_2$, $O_2$ and NO pass through the sodium carbonate bed. Cooling the gas to a temperature of from 40° to 75° C. and preferably to between 50° and 65° C. causes it to become more saturated in water vapor and enhances the reaction. However, when cooling the gas, care should be taken not to cool it below its dew point since condensation within the carbonate bed will diminish its efficiency. In order to achieve maximum recovery of $CO_2$, water should be present in amounts at least equimolar with the $CO_2$. An excess of water is preferred provided the water content of the gas is not so high that the dew point is reached at the reaction temperature of 40° to 75° C.

The above reaction is reversed by heating the reaction product of sodium carbonate and $CO_2$ to a temperature of from 150° to 250° C., thereby forming sodium carbonate, carbon dioxide and water vapor. Virtually 100 percent pure $CO_2$ is recovered upon condensation of the water vapor and venting the $CO_2$ gas into a reservoir. The regenerated sodium carbonate may then be reused for the recovery of additional $CO_2$. Mixing the sodium carbonate with a porous inert material such as foam glass will add mechanical support to the system so that many cycles can be carried out before replacement of the sodium carbonate granules is necessary.

EXAMPLE I

A 1 by 36 inch jacketed iron-pipe reactor was loaded with 255 gm. of 4–6 mesh $NaHCO_3$ which had a BET surface area of approximately 1 $m^2$/gm. The reactor was then heated with steam in the jacket for a period of 3–4 hours to various temperatures up to 185° C. and the liberated $CO_2$ and water vapor collected by condensing the water in a small water cooled trap and venting the $CO_2$ to a steel tank. During the heating cycle pressure in the reactor was held at 40–50 psig by a relief type pressure control valve. The temperature in the reactor was then lowered to between 55° and 70° C. by circulating water through the jacket.

Synthetic stack gas, made up by blending flowing streams of $N_2$, $O_2$, NO and $CO_2$ in ratios encountered in stack gases formed by the combustion of solid and liquid carbonaceous fuel, was passed through a water trap at the reactor temperature to produce a gas stream nearly saturated in water vapor. This stream was then passed through the reactor at a flow of about 1 liter per minute for 3 or 4 hours to complete one full cycle. At the end of this time, the heating step was begun again to start another cycle. The $CO_2$ collected in the storage tank and the water in the trap were weighed after each cycle to follow the performance of the system.

A total of 124 cycles were carried out in the above described manner. The results of representative cycles are summarized in Table I. In Table I, the point at which the gas flow was discontinued and the temperature increased can be determined by a sharp rise in pressure.

TABLE I.—DATA ON $CO_2$ RECOVERY FROM SYNTHETIC STACK GAS

| Cycle | Elapsed time (minutes) | Temperature, °C. | Pressure, p.s.i.g. | Gas flow (ml./mm.) $N_2$ | $CO_2$ | $O_2$ | NO | Wt. $CO_2$ recovered, gm. | Wt. $H_2O$ recovered, gm. |
|---|---|---|---|---|---|---|---|---|---|
| Initial | 0 | 55 | 0 | | | | | | |
| | 15 | 130 | 50 | | | | | | |
| | 30 | 150 | 50 | | | | | | |
| | 75 | 160 | 45 | | | | | | |
| | 135 | 175 | 45 | | | | | | |
| | 210 | 150 | 0 | | | | | 38 | 28 |
| 5 | 0 | 50 | ~0.1 | 800 | 173 | 19.5 | | | |
| | 90 | 55 | ~0.1 | 800 | 187 | 19.5 | | | |
| | 240 | 55 | ~0.1 | 800 | 187 | 19.5 | | | |
| | 275 | 150 | 50 | | | | | | |
| | 345 | 165 | 50 | | | | | 25.5 | 14.0 |
| 9 | 0 | 75 | ~0.1 | 800 | 175 | 20 | | | |
| | 240 | 65 | ~0.1 | 800 | 175 | 20 | | | |
| | 260 | 157 | 50 | | | | | | |
| | 360 | 180 | 50 | | | | | 31.0 | 16.5 |
| 12 | 0 | 50 | ~0.1 | 800 | 175 | 20 | | | |
| | 45 | 72 | ~0.1 | 800 | 175 | 20 | | | |
| | 135 | 68 | ~0.1 | 800 | 175 | 20 | | | |
| | 240 | 65 | ~0.1 | 800 | 175 | 20 | | | |
| | 255 | 130 | 50 | | | | | 35 | 24 |
| 78 | 0 | 65 | ~0.1 | 800 | 175 | 20 | | | |
| | 190 | 67 | ~0.1 | 800 | 175 | 20 | | | |
| | 195 | 125 | 42 | | | | | | |
| | 285 | 180 | 42 | | | | | 28.7 | 17.0 |
| 88 | 0 | 65 | ~0.1 | 850 | 175 | 20 | 0.5 | | |
| | 190 | 67 | ~0.1 | 850 | 175 | 20 | 0.5 | | |
| | 205 | 130 | 50 | | | | | | |
| | 305 | 180 | 50 | | | | | 28.7 | 17.0 |
| 90 | 0 | 65 | ~0.1 | 850 | 175 | 20 | 0.5 | | |
| | 195 | 68 | ~0.1 | 850 | 175 | 20 | 0.5 | | |
| | 210 | 125 | 48 | | | | | | |
| | 330 | 185 | 46 | | | | | 30.0 | 23.0 |
| 116 | 0 | 60 | ~0.1 | 805 | 175 | 20 | 0.5 | | |
| | 180 | 67 | ~0.1 | 805 | 175 | 20 | 0.5 | | |
| | 190 | 130 | 45 | | | | | | |
| | 280 | 177 | 45 | | | | | 31.0 | 19.1 |

We claim:

1. A process for recovering $CO_2$ from water vapor containing gases produced by the combination of carbonaceous material, said gases containing from 16 to 18 percent $CO_2$ along with significant amounts of oxygen, nitrogen, and nitric oxide, which comprises:
    a. contacting the gases at a temperature within the range of from about 40° to 75° C. with solid porous sodium carbonate granules having a BET surface area of greater than 0.3 m²/gm. thereby forming $3NaHCO_3 \cdot Na_2CO_3$;
    b. heating the $3NaHCO_3 \cdot Na_2CO_3$ thus formed to a temperature of from about 150° to 250° C. to decompose it into $CO_2$, $H_2O$ and $Na_2CO_3$; and
    c. recovering the $CO_2$.

2. The process of claim 1 wherein the amount of water vapor in the gas is sufficient to provide at least 1 mole of water per mole of $CO_2$.

3. The process of claim 1 wherein the gas contains from about 3 to 25 volume percent water vapor.

4. The process of claim 1 wherein acid gases are removed from the gas before contacting it with the sodium bicarbonate.

5. The process of claim 1 wherein the sodium carbonate has a BET surface area of 0.5 to 2.0 m²/gm.

6. The process of claim 1 wherein the sodium carbonate is mixed with a porous inert material.

7. The process of claim 6 wherein the inert material is foam glass.

8. The process of claim 1 wherein the gases and sodium bicarbonate granules are contacted at a temperature of from 50° to 65° C.

* * * * *